(12) United States Patent
Huang (10) Patent No.: US 12,323,043 B2
(45) Date of Patent: Jun. 3, 2025

(54) METHOD FOR OPERATING POWER CONVERTER, SEMICONDUCTOR CHIP AND POWER CONVERTER

(71) Applicant: Diodes Incorporated, Plano, TX (US)

(72) Inventor: Feng-Jung Huang, Taoyuan (TW)

(73) Assignee: DIODES INCORPORATED, Plano, TX (US)

( * ) Notice: Subject to any disclaimer, the term of this patent is extended or adjusted under 35 U.S.C. 154(b) by 166 days.

(21) Appl. No.: 18/193,593

(22) Filed: Mar. 30, 2023

(65) Prior Publication Data

US 2024/0171057 A1    May 23, 2024

(30) Foreign Application Priority Data

Nov. 23, 2022 (CN) .......................... 202211476002.9

(51) Int. Cl.
  *H02M 1/00* (2007.01)
  *H02M 3/335* (2006.01)
(52) U.S. Cl.
  CPC ..... *H02M 1/0058* (2021.05); *H02M 3/33569* (2013.01)
(58) Field of Classification Search
  CPC .................. H02M 1/0058; H02M 3/33569
  USPC ...................................... 363/21.18
  See application file for complete search history.

(56) References Cited

U.S. PATENT DOCUMENTS

2014/0334194 A1  11/2014 Davila et al.
2017/0077820 A1* 3/2017 Lu ..................... H02M 3/33523
2019/0199227 A1* 6/2019 Radic ................ H02M 3/33592
2020/0007048 A1* 1/2020 Radic ...................... H02M 1/34
2020/0091826 A1    3/2020 Yang et al.
2020/0366214 A1* 11/2020 Radic ...................... H02M 1/34
(Continued)

FOREIGN PATENT DOCUMENTS

EP  2110934 A1  10/2009
EP  3855488 A1   7/2021
(Continued)

OTHER PUBLICATIONS

Extended European Search Report for European Application No. 23206583.9, mailed May 2, 2024, 10 pages.
(Continued)

*Primary Examiner* — Yemane Mehari
(74) *Attorney, Agent, or Firm* — Kilpatrick Townsend & Stockton LLP (57) ABSTRACT

A power converter includes a voltage transformer, a clamp capacitor, a main switch, a clamp switch, and a control circuit. The clamp capacitor is coupled to the primary winding of the voltage transformer, and the main switch is coupled in series between the primary winding and a ground terminal. The clamp switch is coupled in series between the clamp capacitor and the main switch, and the clamp switch, the main switch, and the primary winding are coupled to a common node. The control circuit turns on the main switch periodically, and turns on the clamp switch before turning on the main switch. After turning off clamp switch and before turning on the main switch, the control circuit determines a length of time that the clamp switch should be turned on next time according to a voltage of the common node sensed right before the main switch is turned on and a threshold voltage.

20 Claims, 8 Drawing Sheets

(56) References Cited

U.S. PATENT DOCUMENTS

| | | | |
|---|---|---|---|
| 2021/0367523 A1* | 11/2021 | Lin | H02M 3/33592 |
| 2022/0190704 A1 | 6/2022 | Lai et al. | |
| 2022/0255455 A1 | 8/2022 | Yang et al. | |

FOREIGN PATENT DOCUMENTS

| | | |
|---|---|---|
| TW | 201722044 A | 6/2017 |
| WO | 2015037537 A1 | 3/2015 |

OTHER PUBLICATIONS

Office Action and Search Report for Taiwan Patent Application No. 112101280, mailed Mar. 11, 2024, 5 pages.

* cited by examiner

METHOD FOR OPERATING POWER CONVERTER, SEMICONDUCTOR CHIP AND POWER CONVERTER

CROSS-REFERENCES TO RELATED APPLICATIONS

This application claims priority to Chinese patent application No. 202211476002.9, filed on Nov. 23, 2022 and entitled "METHOD FOR OPERATING POWER CONVERTER, SEMICONDUCTOR CHIP AND POWER CONVERTER", the disclosure of which is hereby incorporated by reference in its entirety.

TECHNICAL FIELD

The present invention relates to a power converter, a semiconductor chip, and a method for operating the power converter, in particular to a power converter capable of reducing switching loss.

BACKGROUND

Flyback power converters are often used in a variety of electronic products because of their simple architecture and ability to provide electrical isolation through a transformer therein. However, when switching a switch of the primary coil, the conventional flyback power converter does not discharge the parasitic capacitor on the terminal of the switch, but turns on the switch in the form of a hard switching, so the switching loss is serious. Therefore, how to design a more efficient power converter has become an urgent problem to be solved.

SUMMARY

Embodiments of the present disclosure relate to a power converter. The power converter includes a transformer, a clamp capacitor, a main switch, a clamp switch, and a control circuit. The transformer includes a first primary coil and a secondary coil, where a first terminal of the first primary coil is used for receiving an input voltage, and the secondary coil is used for generating an output voltage. The clamp capacitor has a first terminal coupled to the first terminal of the first primary coil. The main switch is connected in series between a second terminal of the first primary coil and a ground terminal. The clamp switch has a first terminal coupled to a second terminal of the clamp capacitor, and a second terminal coupled to a first terminal of the main switch, the clamp switch is connected in series between the clamp capacitor and the main switch, and the second terminal of the clamp switch is further coupled to the second terminal of the first primary coil, so that the second terminal of the clamp switch, the first terminal of the main switch and the second terminal of the first primary coil intersect at a common node. The control circuit includes a voltage detector and a control signal generator. The voltage detector is used for comparing a node voltage of the common node with a first threshold voltage. The control signal generator is used for periodically: turning on the main switch; turning on the clamp switch to generate a reverse current into the second terminal of the primary coil before the main switch is turned on; turning off the clamp switch before the main switch is turned on to discharge an equivalent capacitor on the common node through the reverse current after the clamp switch is turned on for a period; and determining a length of time for which the clamp switch is turned on before the main switch is turned on next time according to a magnitude relationship between the node voltage and the first threshold voltage detected by the voltage detector after the clamp switch is turned off and at a predetermined time point before the main switch is turned on, thereby controlling the voltage of the common node before the main switch is turned on next time to suppress a switching loss of the main switch.

Another embodiment of the present disclosure relates to a chip including the control circuit in the power converter.

Another embodiment of the present disclosure relates to a method for operating a power converter. The power converter includes a transformer, a main switch, a clamp capacitor and a clamp switch, the transformer includes a primary coil and a secondary coil, the main switch is connected in series between a second terminal of the primary coil and a ground terminal, a first terminal of the clamp switch is coupled to a second terminal of the clamp capacitor, a second terminal of the clamp switch is coupled to the first terminal of the main switch and the second terminal of the primary coil, and the second terminal of the clamp switch, the first terminal of the main switch and the second terminal of the primary coil intersect at a common node. The method includes periodically: turning on the main switch to charge the primary coil with an input voltage; turning on the clamp switch to generate a reverse current into the second terminal of the primary coil before the main switch is turned on; turning off the clamp switch before the main switch is turned on to discharge the equivalent capacitor on the common node through the reverse current after the clamp switch is turned on for a period; detecting a magnitude relationship between a node voltage of the common node and a first threshold voltage at a predetermined time point after the clamp switch is turned off and before the main switch is turned on; and determining a length of time for which the clamp switch is turned on before the main switch is turned on next time according to a magnitude relationship between the node voltage and the first threshold voltage detected by the voltage detector after the clamp switch is turned off and at a predetermined time point before the main switch is turned on, thereby controlling the voltage of the common node before the main switch is turned on next time to suppress a switching loss of the main switch.

Since the length of time for which the clamp switch is turned on next time can be determined by the power converter of the present disclosure according to the amplitude of the node voltage of the common node before the main switch is turned on each time, the voltage of the common node can be pulled down to a predetermined range in different circuits and environments, thereby effectively suppressing a switching loss of the main switch.

BRIEF DESCRIPTION OF THE DRAWINGS

Aspects of several embodiments of the disclosure may be best understood from the following detailed description when read with the accompanying drawings. It will be noted that the various structures may not be drawn to scale. In fact, the dimensions of the various structures may be arbitrarily expanded or reduced for clarity of discussion.

The same reference numbers are used throughout the drawings and the detailed description to refer to the same or like parts. Several embodiments of the present disclosure will be readily understood from the following detailed description taken in conjunction with the accompanying drawings.

DETAILED DESCRIPTION OF THE EMBODIMENTS

The following disclosure provides many different embodiments or examples for implementing different features of the provided subject matter. Specific examples of components and configurations are described below. These are, of course, merely examples and are not intended to be limiting. In the present disclosure, references to forming a first feature over or on a second feature may include embodiments that form the first and second features into direct contact, and may also include embodiments that may form additional features between the first and second features such that the first and second features may not be in direct contact. In addition, the present disclosure may repeat reference numerals and/or letters in the various examples. This repetition is for the sake of simplicity and clarity and does not dictate a relationship between the various embodiments and/or configurations discussed.

Embodiments of the present disclosure are discussed in detail below. However, the present disclosure provides many applicable concepts that can be embodied in a wide variety of specific contexts. The embodiments discussed are merely illustrative and do not limit the scope of the disclosure.

The present disclosure provides a power converter, a semiconductor chip, and a method for operating the power converter. The disclosed power converter includes a transformer, a clamp capacitor, a main switch, a clamp switch, and a control circuit. The first terminal of the clamp capacitor is coupled to the first terminal of the primary coil of the transformer, and the main switch is connected in series between the second terminal of the primary coil and a ground terminal. The clamp switch is connected in series between the second terminal of the clamp capacitor and the first terminal of the main switch, and the second terminal of the clamp switch, the first terminal of the main switch and the second terminal of the primary coil intersect at a common node. The control circuit periodically turns on the main switch and turns on the clamp switch for a period before turning on the main switch to generate a reverse current. After the clamp switch is turned on and before the main switch is turned on, the control circuit turns off the clamp switch to discharge an equivalent capacitor on the common node, and determines the length of time for which the clamp switch is turned on next time according to the relationship between the voltage of the common node and the threshold voltage before the main switch is turned on. Since the length of time for which the clamp switch is turned on next time can be determined by the power converter of the present disclosure according to the amplitude of the node voltage of the common node before the main switch is turned on each time, the voltage of the common node can be pulled down to a predetermined range in different circuits and environments, thereby effectively suppressing a switching loss of the main switch.

Figure 1:
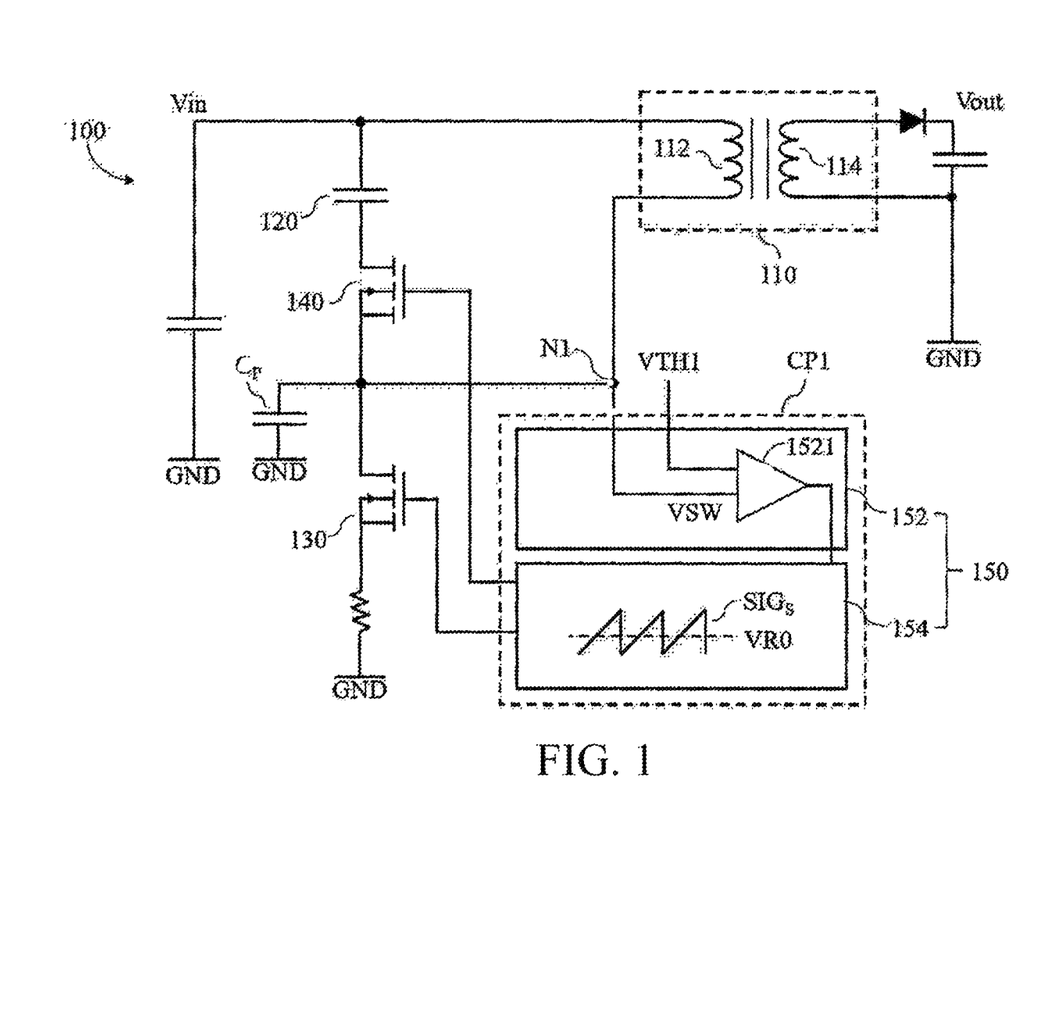
FIG. 1 is a schematic diagram of a power converter according to an embodiment of the present disclosure.

FIG. 1 is a schematic diagram of a power converter according to an embodiment of the present disclosure. As shown in FIG. 1, a power converter 100 may include a transformer 110, a clamp capacitor 120, a main switch 130, a clamp switch 140, and a control circuit 150. In this embodiment, the power converter may be, for example, an active clamp flyback power converter.

The transformer 110 includes a primary coil 112 and a secondary coil 114. A first terminal of the primary coil 112 may receive an input voltage $V_{in}$, and the secondary coil 114 may induce and output an output voltage $V_{out}$ according to a change in current on the primary coil 112. The clamp capacitor 120 has a first terminal and a second terminal, and the first terminal of the clamp capacitor 120 may be coupled to the first terminal of the primary coil 112. The main switch 130 is connected in series between the second terminal of the primary coil 112 and the ground terminal GND. The clamp switch 140 has a first terminal and a second terminal, the first terminal of the clamp switch 140 may be coupled to the second terminal of the clamp capacitor 120, and the second terminal of the clamp switch 140 may be coupled to the first terminal of the main switch 130. That is, the clamp switch 140 may be connected in series between the clamp capacitor 120 and the main switch 130, and a second terminal of the clamp switch 140 may also be coupled to the second terminal of the primary coil 112 such that the second terminal of the clamp switch 140, the first terminal of the main switch 130, and the second terminal of the primary coil 112 intersect at a common node N1.

The power converter 100 may be primarily operated in two stages. In the first stage, the control circuit 150 may turn on the main switch 130, at which time the primary coil 112 may receive input voltage $V_{in}$ and store energy. Then, in the second stage, the control circuit 150 may turn off the main switch 130, at which time the energy stored in the primary coil 112 is transferred to the secondary coil 114 by electromagnetic induction, and energy is transferred to the output terminal via the secondary coil 114 to maintain the output voltage $V_{out}$. In addition, in the second stage, the power converter 100 may also store the leakage inductance energy of the primary coil 112 through the clamp capacitor 120, enabling the power converter 100 to have a high power conversion efficiency. By repeatedly performing the operations of the first stage and the second stage, the power converter 100 can stably convert the input voltage $V_{in}$ into the output voltage $V_{out}$ and output same.

However, when the main switch 130 is turned on, if the node voltage VSW of the common node N1 is relatively high, the main switch 130 will be turned on when the drain-source voltage is relatively high, and at this time, the main switch 130 will generate a relatively large switching loss, which is equivalent to enabling the main switch 130 to be turned on in a hard switching state. In order to solve this problem, in this embodiment, the control circuit 150 may turn on the clamp switch 140 for a period and then turn off before turning on the main switch 130 each time to pull down the node voltage VSW of the common node N1, thereby reducing the drain-source voltage of the main switch 130 and reducing a switching loss of the main switch 130, which is equivalent to enabling the main switch 130 to be turned on in a soft switching state. In addition, in order to enable the drain voltage of the main switch 130 to be pulled down to a predetermined range to make the main switch 130 be turned on in the soft switching state as much as possible, in this embodiment, the control circuit 150 may detect whether the node voltage VSW of the common node N1 is sufficiently low before turning on the main switch 130 each time, and determine the length of time for which the clamp switch 140 is turned on next time according to the embodiment.

As shown in FIG. 1, the control circuit 150 may include a voltage detector 152 and a control signal generator 154. The voltage detector 152 may compare node voltage VSW of common node N1 with threshold voltage VTH1. In this embodiment, VTH1 is set to 10 volts, however, a person skilled in the art may change its value as desired without being limited by this embodiment. The control signal generator 154 may generate a main control signal $SIG_{M1}$ to control the main switch 130 and a clamp control signal $SIG_{C1}$ to control the clamp switch 140. The control signal generator 154 may periodically turn on the main switch 130 so that the power converter 100 can alternately and repeatedly perform the first and second stages of operation.

Figure 2:
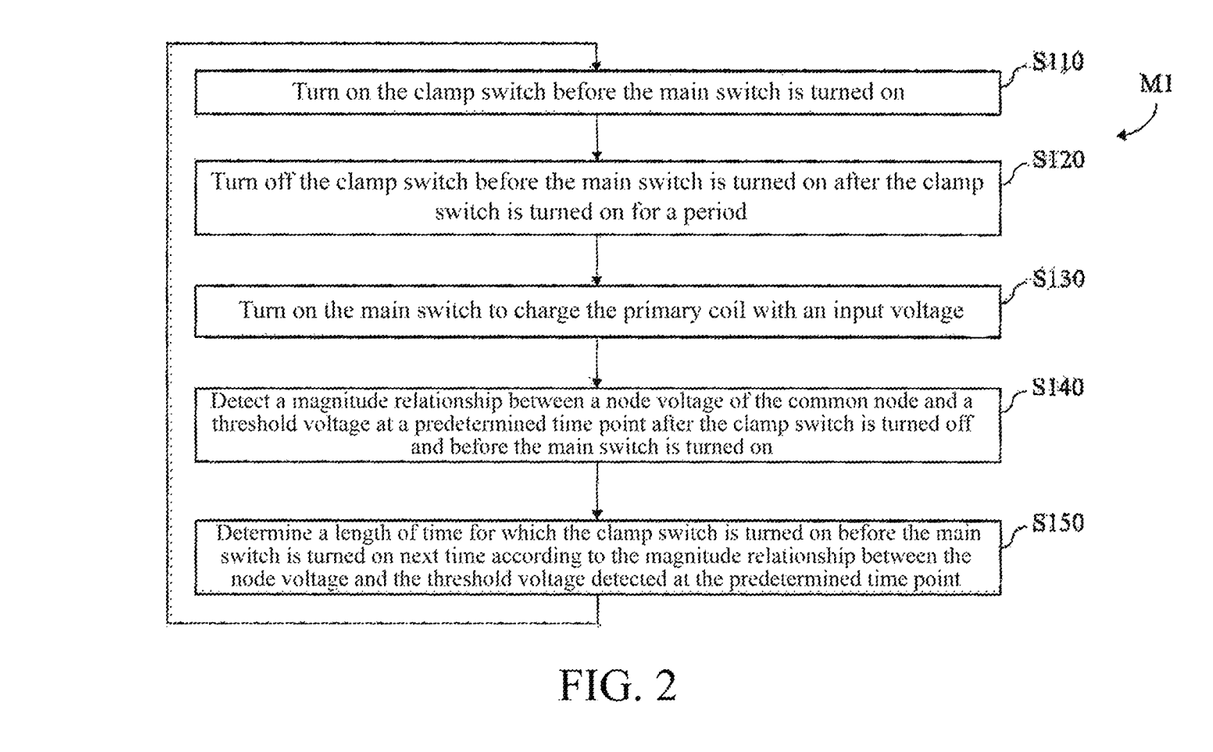
FIG. 2 is a flow chart of a method for operating the power converter of FIG. 1 according to an embodiment of the present disclosure.
Figure 3:
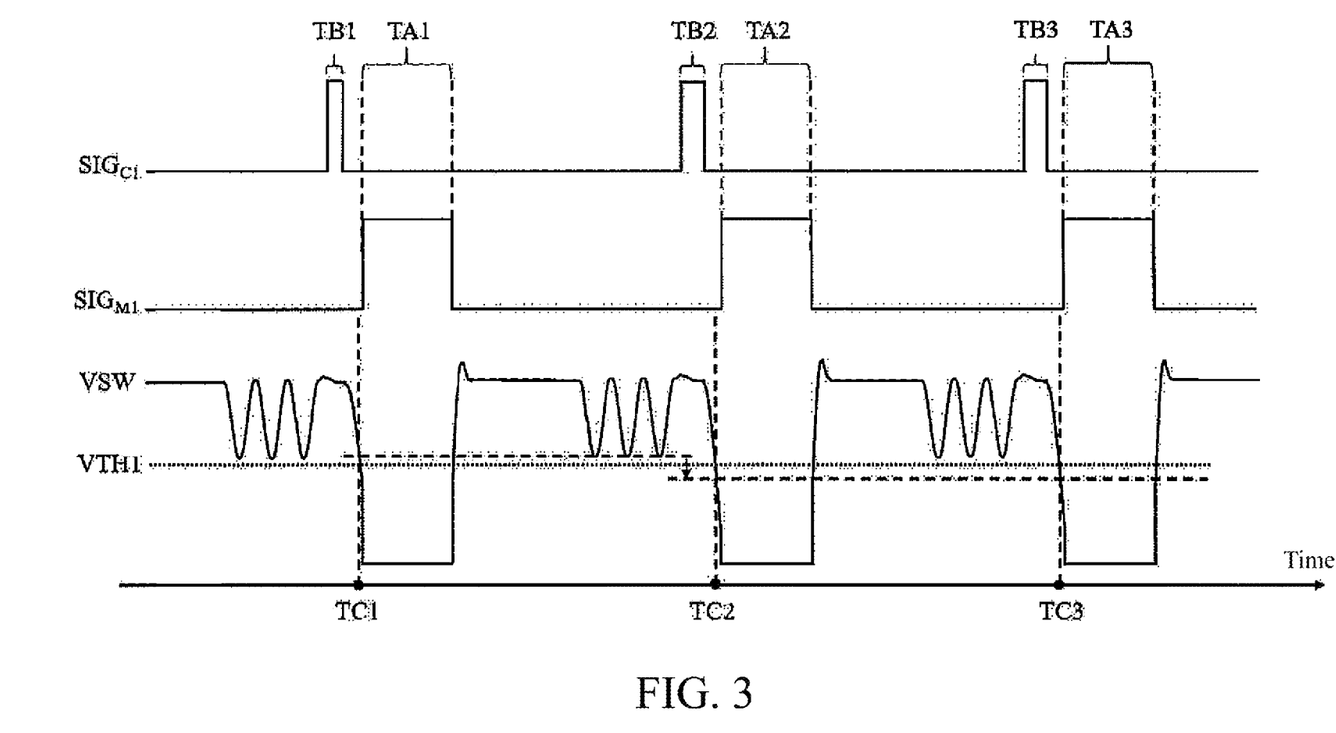
FIG. 3 is an operation timing diagram of the power converter of FIG. 1 according to the method for FIG. 2.

FIG. 2 is a flowchart of a method for operating M1 of the power converter 100 according to an embodiment of the present disclosure; FIG. 3 is an operation timing diagram of the power converter 100 according to the method M1. As shown in FIG. 2, the method M1 may include repeating the steps S110 to S150. In this embodiment, the main switch 130 may be, for example, an N-type transistor, so in FIG. 3, when the main control signal $SIG_{M1}$ is at a logic high potential, the main switch 130 will be turned on, and the power converter 100 operates in the first stage; when the main control signal $SIG_{M1}$ is at a logic low level, the main switch 130 is turned off and the power converter 100 operates in the second stage. In addition, the clamp switch 140 may be, for example, an N-type transistor, such that when the clamp control signal $SIG_{C1}$ is at a logic high potential, the clamp switch 140 is turned on, and when the clamp control signal $SIG_{C1}$ is at a logic low potential, the clamp switch 140 is turned off.

In this case, as shown in FIG. 3, the clamp switch 140 is turned on during the periods TB1, TB2 and TB3, the clamp switch 140 is turned off after the periods TB1, TB2 and TB3, and the main switch 130 is turned on during the periods TA1, TA2 and TA3. Further, the voltage detector 152 detects the magnitude relationship between the node voltage VSW of the common node N1 and the threshold voltage VTH1 at predetermined time points TC1, TC2 and TC3 before the periods TA1, TA2 and TA3, and determines the length of time for which the next clamp switch 140 is turned on.

For ease of understanding, the following description may refer to FIGS. 1, 2, and 3 simultaneously. In this embodiment, the control circuit 150 may turn on the clamp switch 140 (step S110) before each time the main switch 130 is turned on to generate a reverse current into the second terminal of the primary coil 112. After the clamp switch 140 is turned on for a period, the control circuit 150 turns off the clamp switch 140 before turning on the main switch 130 (step S120), at which time the reverse current draws a charge from the equivalent capacitor $C_p$ on the common node N1, i.e., discharges the equivalent capacitor $C_p$, thereby pulling down the voltage of the node voltage VSW of the common node N1. As a result, the main switch 130 can be turned on with a small drain-source voltage (step S130), thereby reducing a switching loss of the main switch 130.

Since the equivalent capacitor $C_p$ on the common node N1 may include the overall equivalent capacitor of a plurality of capacitors, such as the parasitic capacitor of the main switch 130, the parasitic capacitor of the clamp switch 140 and the mirror capacitor at the corresponding position on the secondary side, the magnitude of the equivalent capacitor $C_p$ may be related to the manufacturing process, the circuit where it is located and the operating environment (e.g. temperature). In this case, even if the power converter 100 is generated based on the same design, the equivalent capacitor $C_p$ on its common node N1 may be different in actual operation. That is, each of the power converters 100 must discharge the equivalent capacitor $C_p$ differently in order to pull down the node voltage VSW to the appropriate range.

In order to enable the main switches in different power converters 100 to be turned on in the soft switching state; in this embodiment, the control signal generator 154 may determine the magnitude relationship between the node voltage VSW and the threshold voltage VTH1 detected by the voltage detector 152 at a predetermined time point after the clamp switch 140 is turned off and before the main switch 130 is turned on (step S140), and determine a length of time that the clamp switch 140 is turned on before the main switch 130 is turned on next time (step S150). Thus, the voltage of the common node N1 can be pulled down by passing an appropriate discharge current before the main switch 130 is turned on next time, thereby more effectively suppressing a switching loss of the main switch 130.

For example, as shown in FIG. 3, the node voltage VSW detected by the voltage detector 152 at the time point TC1 is greater than the threshold voltage VTH1 before the time period TA1 when the main switch 130 is turned on, indicating that the drain-source voltage of the main switch 130 is still high when the main switch is turned on at the time period TA1, so that the control signal generator 154 may extend the length of time for which the clamp switch 140 is turned on before the main switch 130 is turned on next time (i.e., before the time period TA2) to increase the backflow into the second terminal of the primary coil 112. That is, the length of the time period TB2 during which the clamp switch 140 is turned on for the second time is greater than that of the time period TB1 during which the clamp switch 140 is turned on for the first time, so that the clamp switch 140 will be turned on longer in the time period TB2 and generate a larger reverse current so that the power converter 100 can discharge the equivalent capacitor $C_p$ by the larger reverse current during the time period after the clamp switch 140 is turned off and before the main switch 130 is turned on (i.e., the time period between the time periods TB2 and TA2), thereby pulling the node voltage VSW further down to a lower level before the main switch 130 is turned on. As shown in FIG. 3, the node voltage VSW detected by the voltage detector 152 at a time point TC2 is smaller than the node voltage VSW detected by the voltage detector 152 at a time point TC1, so that the switching loss when the main switch 130 is turned on again at the time period TA2 is low.

Further, in this embodiment, when the voltage detector 152 detects that the node voltage VSW is less than the threshold voltage VTH1 at the predetermined time point TC2, the control signal generator 154 maintains and fixes the length of time for which the clamp switch 140 is turned on before the main switch 130 is turned on subsequently each time. For example, in FIG. 3, since the node voltage VSW detected by the voltage detector 152 at the time point TC2 is less than the threshold voltage VTH1, the control signal generator 154 may cause the clamp switch 140 to be turned on next time for a same length of time, i.e., the length of the time period TB3 may be equal to that of the time period TB2.

However, this application is not limited thereto. In some embodiments, the operating environment of the power converter 100, such as temperature, may change over time, and the input voltage $V_{in}$ may also change over time in a test environment; in this case, the time that the fixed clamp switch 140 is turned on may not effectively suppress a switching loss of the main switch 130 for a long time. Thus, the control signal generator 154 may also adjust the time that the clamp switch 140 is turned on according to other mechanisms, not necessarily making the time that subsequent clamp switches 140 are turned on be fixed.

Figure 4:
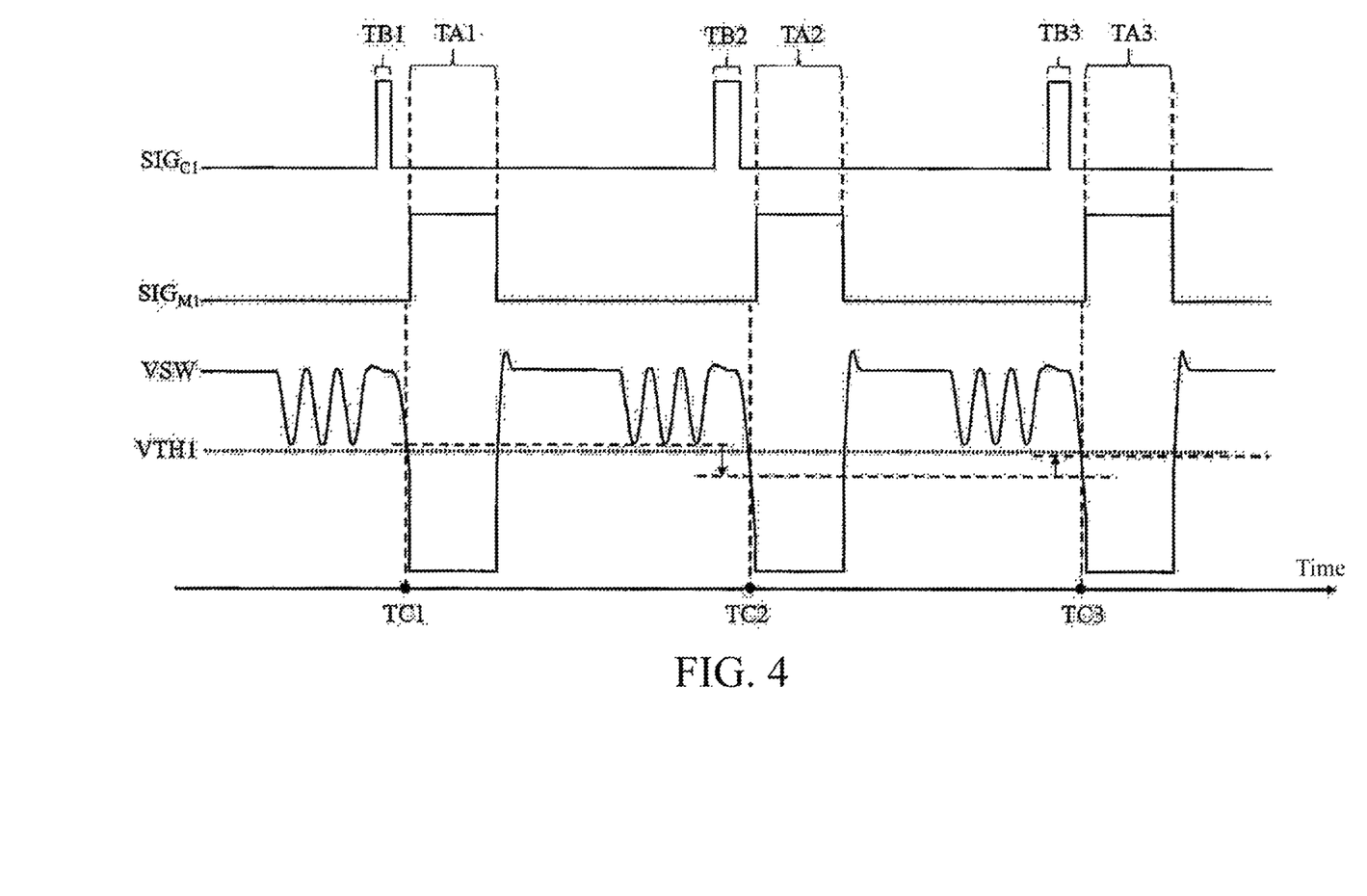
FIG. 4 is an operation timing diagram of the power converter of FIG. 1 according to another embodiment.

FIG. 4 is an operation timing diagram of the power converter 100 according to another embodiment. In FIG. 4, when the voltage detector 152 detects that the node voltage VSW is greater than the threshold voltage VTH1 at the time point TC1, the control signal generator 154 may extend the clamp switch 140 is turned on next time, such that the length of the time period TB2 is greater than that of the time period TB1. However, when the voltage detector 152 detects that the node voltage VSW is less than the threshold voltage VTH1 at the time point TC2, the control signal generator 154 may shorten the clamp switch 140 is turned on next time, such that the length of the time period TB3 is less than that of the time period TB2. As such, the control signal generator 154 may also dynamically adjust the time that the clamp switch 140 is turned on as operating conditions change.

Figure 5:
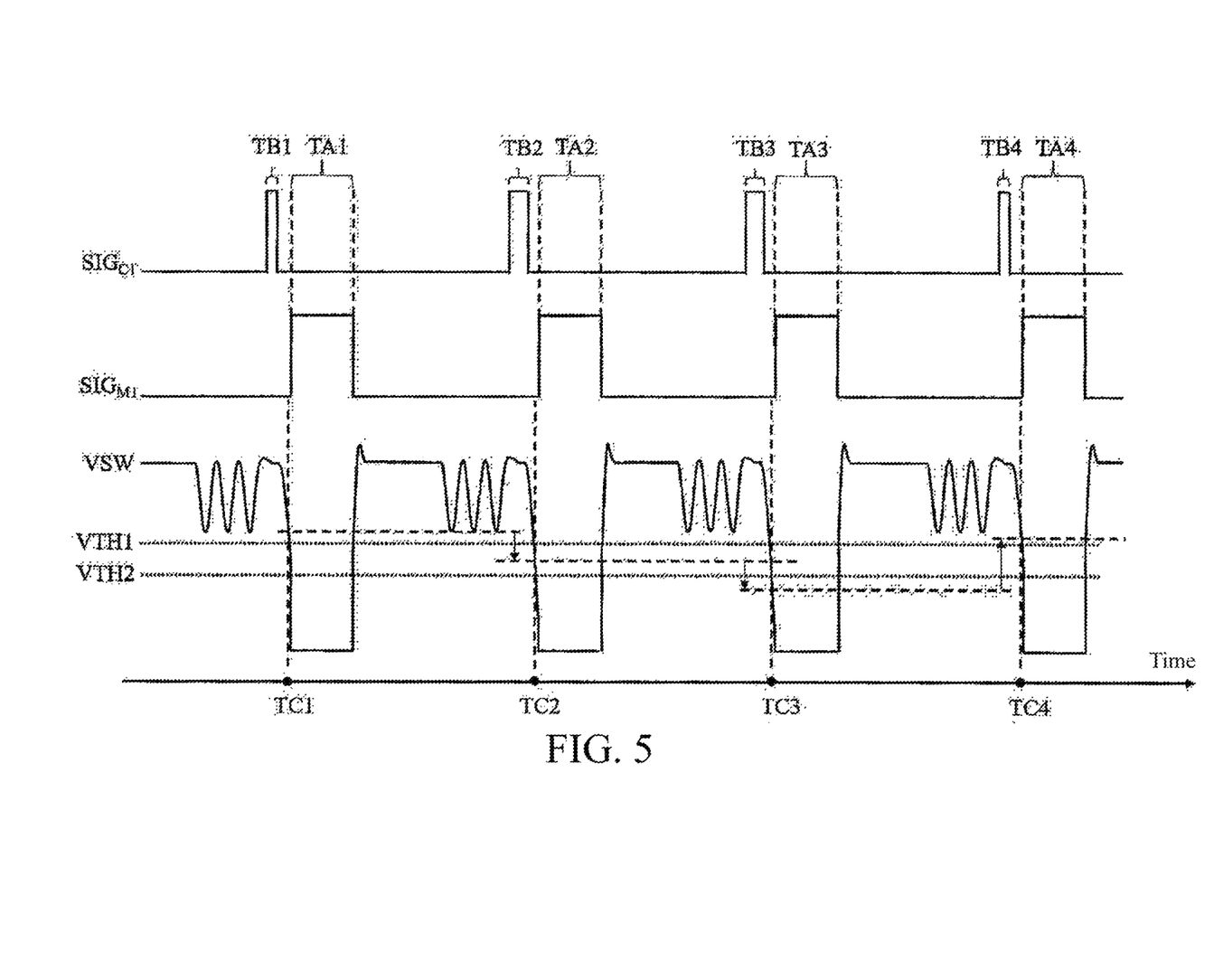
FIG. 5 is an operation timing diagram of the power converter of FIG. 1 according to another embodiment.

FIG. 5 is an operation timing diagram of the power converter 100 according to another embodiment. In the embodiment of FIG. 5, the voltage detector 152 may compare the node voltage VSW with two threshold voltages VTH1 and VTH2 at predetermined time points TC1, TC2, TC3 and TC4, and adjust the length of time for which the next clamp switch 140 is turned on according to the magnitude relationship between the node voltage VSW and the threshold voltages VTH1 and VTH2, where the threshold voltage VTH2 is less than the threshold voltage VTH1.

For example, when the voltage detector 152 detects that node voltage VSW is greater than threshold voltage VTH1 at the time point TC1, the control signal generator 154 may extend the length of time for which the clamp switch 140 is turned on next time, such that the length of the time period TB2 is greater than that of the time period TB1. When voltage detector 152 detects that node voltage VSW is less than threshold voltage VTH1 and greater than threshold voltage VTH2 at the time point TC2, control signal generator 154 may maintain the length of time for which the clamp switch 140 is turned on next time, such that the length of the time period TB3 is equal to that of the time period TB2. However, if the voltage detector 152 detects that node voltage VSW is less than threshold voltage VTH2 at the time point TC3, the control signal generator 154 may shorten the length of time for which the clamp switch 140 is turned on next time, such that the length of the time period TB4 is less than that of the time period TB3. In this embodiment, VTH1 is set to 10 volts and VTH2 is set to 5 volts, however a person skilled in the art may change their values as desired without being limited by this embodiment.

That is, the control signal generator 154 adjusts the length of time for which the clamp switch 140 is turned on next time only when the node voltage VSW is greater than the threshold voltage VTH1 or less than the threshold voltage VTH2, and maintains the length of time for which the clamp switch 140 is turned on next time when the node voltage VSW is between the threshold voltage VTH1 and the threshold voltage VTH2. As such, it is possible to avoid adjusting the time of turning on the clamp switch 140 too frequently, thereby achieving a hysteresis-like control effect. In other embodiments, the power converter 100 may be provided with more than two threshold voltages as desired.

Further, in the embodiment of FIG. 1, the voltage detector 152 may include a comparator 1521. A first terminal of the comparator 1521 may be coupled to a first terminal of the main switch 130, and a second terminal of the comparator 1521 may receive the threshold voltage VTH1. That is, the voltage detector 152 may directly compare the node voltage VSW of the common node N1 with the threshold voltage VTH1 through the comparator 1521. However, the present disclosure is not limited thereto. In some embodiments, directly using node voltage VSW as the input voltage to the comparator 1521 may result in damage to the comparator 1521 because node voltage VSW may have a higher voltage value. In this case, the voltage detector 152 may compare the magnitude relationship between the node voltage VSW and the threshold voltage VTH1 in other manners.

Figure 6:
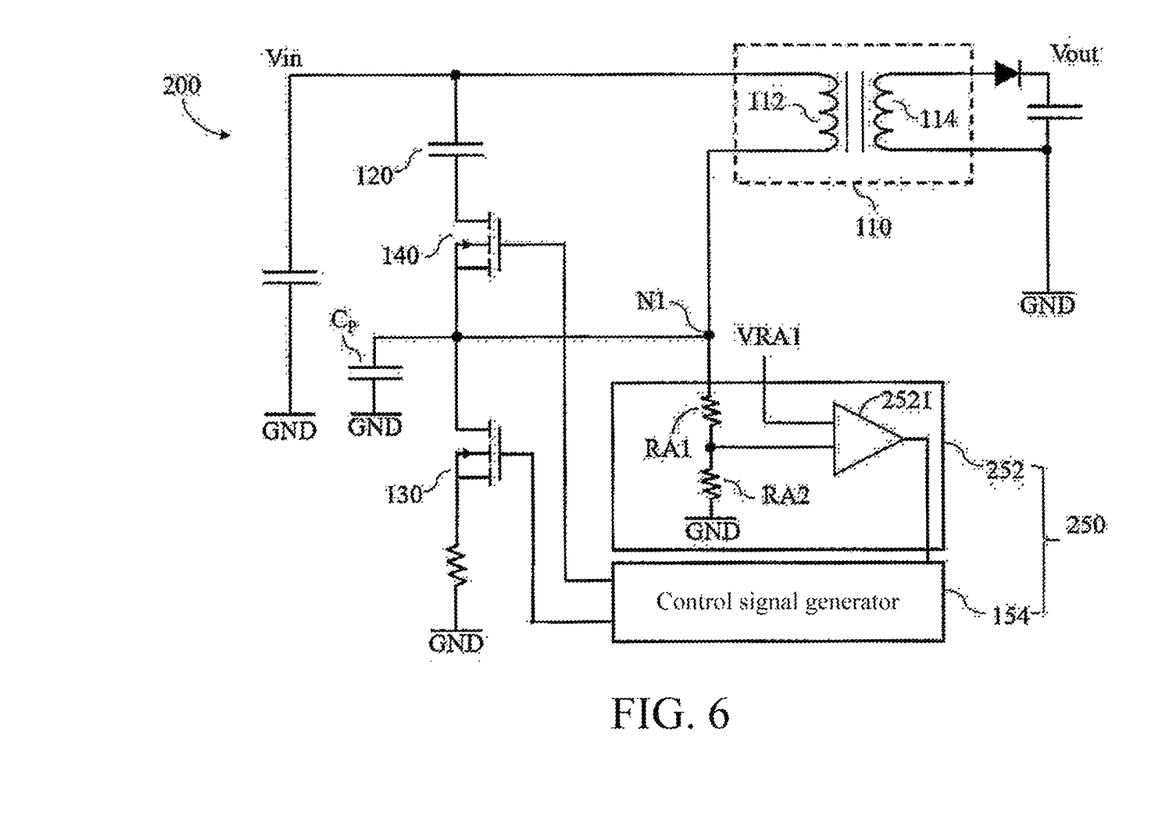
FIG. 6 is a schematic diagram of a power converter according to another embodiment of the present disclosure.

FIG. 6 is a schematic diagram of a power converter according to another embodiment of the present disclosure. The power converter 200 may have a similar structure and operate according to similar principles as the power converter 100, however, the voltage detector 252 in the power converter 200 may include resistors RA1, RA2 and comparator 2521. A first terminal of the resistor RA1 may be coupled to a first terminal of a main switch 130, a first terminal of the resistor RA2 may be coupled to a second terminal of the resistor RA1, and a second terminal of the resistor RA2 may be coupled to a ground terminal GND. Further, a first terminal of the comparator 2521 may be coupled to a second terminal of the resistor RA1, and a second terminal of the comparator 2521 may receive a reference voltage VRA1 corresponding to the threshold voltage VTH1.

That is, the voltage detector 252 may divide node voltage VSW through resistors RA1 and RA2 to reduce the voltage received at the first terminal of the comparator 2521. In this case, the reference voltage VRA1 may also be less than the threshold voltage VTH1, and the ratio of the reference voltage VRA1 to the threshold voltage VTH1 may be equal to that of the resistor RA2 to the sum of the resistances RA1 and RA2, i.e., RA2/(RA1+RA2). As such, the voltage detector 252 may be implemented using a conventional low withstand voltage comparator 2521.

Figure 7:
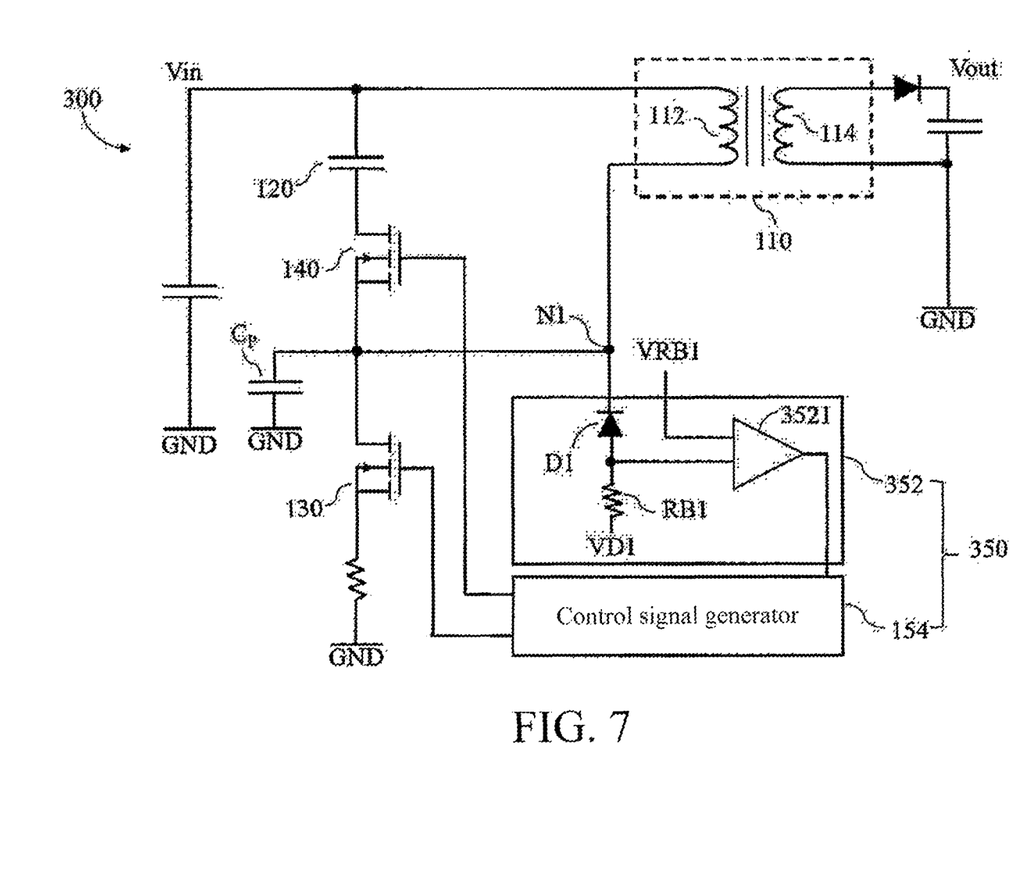
FIG. 7 is a schematic diagram of a power converter according to another embodiment of the present disclosure.

FIG. 7 is a schematic diagram of a power converter according to another embodiment of the present disclosure. The power converter 300 may have a similar structure and operate according to similar principles as a power converter 100, however, the voltage detector 352 in the power converter 300 may include a diode D1, a resistor RB1, and a comparator 3521. A cathode of the diode D1 may be coupled to a first terminal of the main switch 130, a first terminal of the resistor RB1 may be coupled to an anode of diode D1, and a second terminal of the resistor RB1 may receive a predetermined bias voltage VD1. A first terminal of the comparator 3521 may be coupled to a first terminal of the resistor RB1, and a second terminal of the comparator 3521 may receive a reference voltage VRB1 corresponding to the threshold voltage VTH1.

In this embodiment, the predetermined bias voltage VD1 may be greater than the reference voltage VRB1. In this case, when the node voltage VSW is greater than the predetermined bias voltage VD1, the diode D1 will be in a reverse bias state, so that the first terminal of the comparator 3521 will receive the predetermined bias voltage VD1, at which time the comparator 3521 will output the first voltage. Conversely, when the node voltage VSW is less than the predetermined bias voltage VD1 minus the threshold voltage of the diode D1, the diode D1 will be in a forward bias state, so that the first terminal of the comparator 3521 will receive the node voltage VSW plus the threshold voltage of the diode D1, at which time the comparator 3521 will output a second voltage different from the first voltage. That is, by appropriately setting the predetermined bias voltage VD1 and the reference voltage VRB1, it is possible for the comparator 3521 to compare the node voltage VSW with the reference voltage VRB1 only when the node voltage VSW is small, thereby preventing the comparator 3521 from receiving an excessively high voltage.

Figure 8:
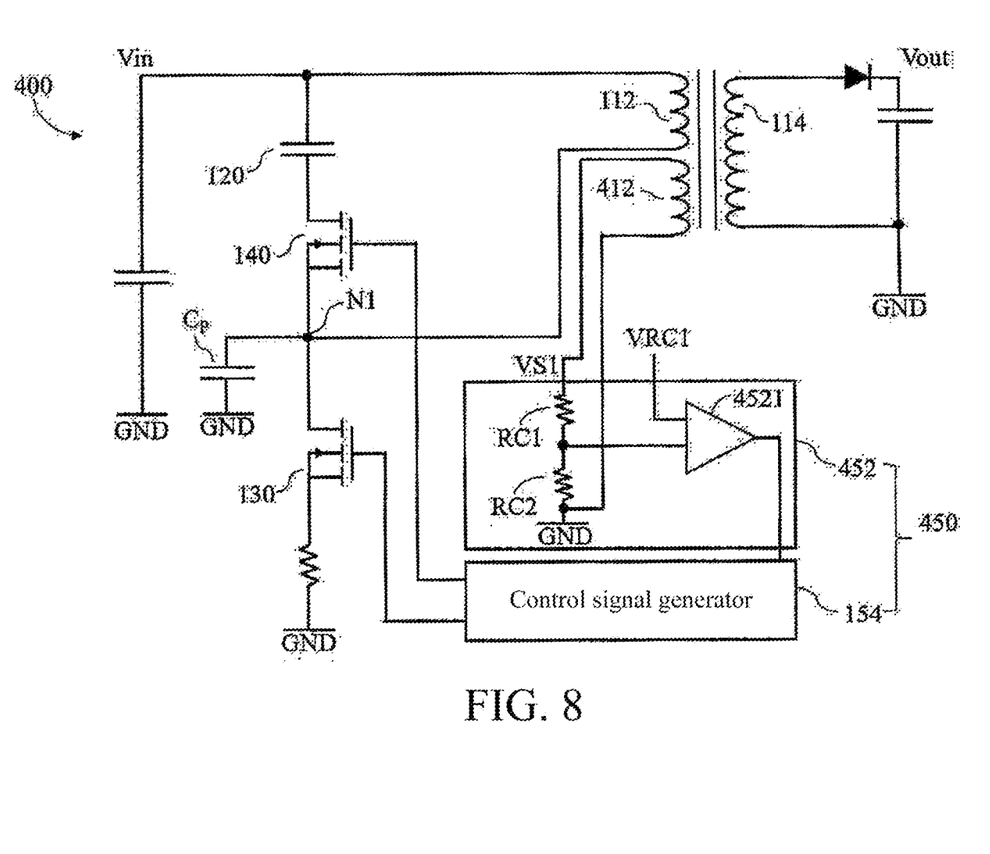
FIG. 8 is a schematic diagram of a power converter according to another embodiment of the present disclosure.

FIG. 8 is a schematic diagram of a power converter according to another embodiment of the present disclosure. The power converter 400 may have a similar structure and may operate according to similar principles as the power converter 100, however, the power converter 400 may include two primary coils 112 and 412 and the voltage detector 452 may include resistors RC1, RC2 and the comparator 4521. In this embodiment, the power converter 400 may generate the sensing voltage VS1 corresponding to the node voltage VSW through the primary coil 412, and may divide the sensing voltage VS1 through the resistors RC1 and RC2.

As shown in FIG. 8, a first terminal of the resistor RC1 may be coupled to a first terminal of the primary coil 412, a first terminal of the resistor RC2 may be coupled to a second terminal of the resistor RC1, and a second terminal of the resistor RC2 may be coupled to a second terminal of the primary coil 412 and a ground terminal GND. Further, a first terminal of the comparator 4521 may be coupled to a second terminal of the resistor RC1, and a second terminal of the comparator 4521 may receive reference voltage VRC1 corresponding to threshold voltage VTH1.

In this embodiment, since the power converter 400 generates the sensing voltage VS1 corresponding to the node voltage VSW through the primary coil 412 and divides the voltage through the resistors RC1, RC2, the influence on the node voltage VSW in the detection process can be reduced, and the input voltage of the comparator 4521 can be reduced.

Further, in the power converters 100, 200, 300 and 400, the control signal generator 154 thereof may control the clamp switch 140 by generating the clamp control signal $SIG_{C1}$ in addition to the periodic square wave signal $SIG_{M1}$ to control the main switch 130, and may adjust the time for which the clamp switch 140 is turned on each time by adjusting the pulse width of the clamp control signal 140. For example, in the embodiment of FIG. 1, the control circuit 150 may include an analog circuit and the control signal generator 154 may include a comparator (not shown) that may compare the reference voltage VR0 with a sawtooth wave SIGs (or a triangular wave). In this case, the control signal generator 154 may control the pulse width of the clamp control signal $SIG_{C1}$ by adjusting the move mode of the sawtooth wave SIGs (or a triangular wave) or adjusting the level of the reference voltage VR0.

However, the present disclosure is not limited thereto, and in some other embodiments, the control circuit 150 may include a digital circuit and the control signal generator 154 may include a register and a counter. In this case, the control signal generator 154 may store a value related to the pulse width in the register, and the counter may count the clock signal in the digital circuit to control the pulse width of the clamp control signal $SIG_{C1}$ according to the value stored in the register.

Further, in some embodiments, the control circuit 150 may be provided, for example, in a separate chip CP1, so that the circuit designer may more conveniently use the chip CP1 to detect the voltage of the primary coil therein and control the clamp switch thereof and the main switch to be turned on in various power converter designs. Similarly, the control circuits 250, 350, and 450 may also be designed as chips for use by circuit designers.

In summary, embodiments of the present disclosure provide a power converter, a semiconductor chip, and a method for operating a power converter. Since the length of time for which the clamp switch is turned on next time can be determined by the power converter of the present disclosure according to the amplitude of the node voltage of the common node before the main switch is turned on each time, the voltage of the common node can be pulled down to a predetermined range in different circuits and environments, thereby effectively suppressing a switching loss of the main switch.

Spatially relative terms, such as "below", "under", "lower", "above", "upper", "left", "right", and the like, may be used herein for ease of description to describe relationship between one component or feature and another component(s) or feature(s) as illustrated in the figures. Spatially relative terms are intended to encompass different orientations of the device in use or operation in addition to the orientation depicted in the figures. The devices may be otherwise oriented (rotated 90 degrees or at other orientations) and the spatially relative descriptors used herein may be interpreted in a corresponding manner. It will be understood that when an element is referred to as being "connected" or "coupled" to another element, it can be directly connected or coupled to the other element or intervening elements may be present.

As used herein, the terms "about", "substantially", "generally", and "approximately" are used to describe and explain minor variations. When used in connection with an event or circumstance, the term can refer to instances where the event or circumstance occurs precisely as well as instances where the event or circumstance occurs nearly. As used herein with respect to a given value or range, the term "about" generally means within ±10%, ±5%, ±1%, or ±0.5% of the given value or range. Ranges can be expressed herein as from one endpoint to another endpoint, or between two endpoints. All ranges disclosed herein are inclusive of the endpoints, unless otherwise specified. The term "substantially coplanar" can mean that two surfaces are positioned within a few micrometers (μm) of difference in position along the same plane, such as within 10 μm, within 5 μm, within 1 μm, or within 0.5 μm of difference in position along the same plane. When numerical values or characteristics are referred to as being "substantially" the same, the term can refer to values that are within ±10%, ±5%, ±1%, or ±0.5% of the average of the stated values.

The foregoing has outlined features of several embodiments and detailed aspects of the disclosure. The embodiments described in the present disclosure may be readily utilized as a basis for designing or modifying other processes and structures for carrying out the same or similar purposes and/or to achieve the same or similar advantages of the embodiments described herein. Such equivalent constructions do not depart from the spirit and scope of the present disclosure, and various changes, substitutions, and alterations may be made without departing from the spirit and scope of the present disclosure.

What is claimed is:

1. A power converter comprising:
a transformer comprising a first primary coil and a secondary coil, a first terminal of the first primary coil being used for receiving an input voltage, and the secondary coil being used for generating an output voltage;
a clamp capacitor having a first terminal coupled to the first terminal of the first primary coil;
a main switch connected in series between a second terminal of the first primary coil and a ground terminal;
a clamp switch having a first terminal coupled to a second terminal of the clamp capacitor, and a second terminal coupled to a first terminal of the main switch, the clamp switch being connected in series between the clamp capacitor and the main switch, and the second terminal of the clamp switch being further coupled to the second terminal of the first primary coil, so that the second terminal of the clamp switch, the first terminal of the main switch and the second terminal of the first primary coil intersect at a common node; and
a control circuit comprising:
a voltage detector for comparing a node voltage of the common node with a first threshold voltage; and
a control signal generator for periodically:
turning on the main switch,
turning on the clamp switch before the main switch is turned on to generate a reverse current flowing into the second terminal of the first primary coil,
turning off the clamp switch before the main switch is turned on to discharge an equivalent capacitor on the common node through the reverse current after the clamp switch is turned on for a period, and
determining a length of time for which the clamp switch is turned on before the main switch is turned on next time according to a magnitude relationship between the node voltage and the first threshold voltage detected by the voltage detector after the clamp switch is turned off and at a predetermined time point before the main switch is turned on, thereby controlling the node voltage of the common node before the main switch is turned on next time to suppress a switching loss of the main switch.

2. The power converter according to claim 1, wherein when the voltage detector detects that the node voltage is greater than the first threshold voltage at the predetermined time point, the control signal generator extends the length of time for which the clamp switch is turned on before the main switch is turned on next time.

3. The power converter according to claim 2, wherein when the voltage detector detects that the node voltage is less than the first threshold voltage at the predetermined time point, the control signal generator maintains and fixes the length of time for which the clamp switch is turned on before the main switch is turned on subsequently each time.

4. The power converter according to claim 2, wherein when the voltage detector detects that the node voltage is less than the first threshold voltage at the predetermined time point, the control signal generator shortens the length of time for which the clamp switch is turned on before the main switch is turned on next time.

5. The power converter according to claim 2, wherein:
when the voltage detector detects that the node voltage is less than the first threshold voltage and greater than a second threshold voltage at the predetermined time point, the control signal generator maintains the length of time for which the clamp switch is turned on before the main switch is turned on, wherein the second threshold voltage is less than the first threshold voltage.

6. The power converter according to claim 5, wherein:
when the voltage detector detects that the node voltage is less than the second threshold voltage at the predetermined time point, the control signal generator shortens the length of time for which the clamp switch is turned on before the main switch is turned on next time.

7. The power converter according to claim 1, wherein the voltage detector comprises:
a first comparator having a first terminal coupled to the first terminal of the main switch, and a second terminal used for receiving the first threshold voltage.

8. The power converter according to claim 1, wherein the voltage detector comprises:
a first resistor having a first terminal coupled to the first terminal of the main switch;
a second resistor having a first terminal coupled to a second terminal of the first resistor, and a second terminal coupled to a ground terminal; and
a first comparator having a first terminal coupled to the second terminal of the first resistor, and a second terminal for receiving a first reference voltage corresponding to the first threshold voltage.

9. The power converter according to claim 1, wherein the voltage detector comprises:
a diode having a cathode coupled to the first terminal of the main switch;
a resistor having a first terminal coupled to an anode of the diode and a second terminal for receiving a predetermined bias voltage; and
a first comparator having a first terminal coupled to the first terminal of the resistor and a second terminal for receiving a first reference voltage corresponding to the first threshold voltage; and
wherein the predetermined bias voltage is greater than the first reference voltage.

10. The power converter according to claim 1, further comprising a second primary coil for generating a sensing voltage corresponding to the node voltage, wherein the voltage detector comprises:
a first resistor having a first terminal coupled to a first terminal of the second primary coil;
a second resistor having a first terminal coupled to a second terminal of the first resistor, and a second terminal coupled to a second terminal of the second primary coil and a ground terminal; and
a first comparator having a first terminal coupled to the second terminal of the first resistor, and a second terminal for receiving a first reference voltage corresponding to the first threshold voltage.

11. The power converter according to claim 1, wherein the control signal generator is configured to turn on the clamp switch by generating a clamp control signal and to adjust a time when the clamp switch is turned on each time by adjusting a pulse width of the clamp control signal.

12. The power converter according to claim 11, wherein the control circuit comprises a digital circuit, and the control signal generator comprises a register and a counter, the control signal generator controls the pulse width of the clamp control signal by storing a value associated with the pulse width in the register and causing the counter to count according to the value.

13. The power converter according to claim 11, wherein the control circuit comprises an analog circuit, and the control signal generator comprises a second comparator to compare a second reference voltage with a sawtooth wave or a triangular wave, wherein the control signal generator controls a pulse width of the clamp control signal by adjusting a wave mode of the triangular wave or the sawtooth wave or adjusting a second reference voltage.

14. A semiconductor chip, characterized by comprising the control circuit in the power converter according to claim 1.

15. A method for operating a power converter, characterized in that the power converter comprises a transformer, a main switch, a clamp capacitor and a clamp switch, the transformer comprises a primary coil and a secondary coil, the main switch is connected in series between a second terminal of the primary coil and a ground terminal, a first terminal of the clamp switch is coupled to a second terminal of the clamp capacitor, a second terminal of the clamp switch is coupled to the first terminal of the main switch and the second terminal of the primary coil, and the second terminal of the clamp switch, the first terminal of the main switch and the second terminal of the primary coil intersect at a common node, the method comprising periodically:
  turning on the main switch to charge the primary coil with an input voltage;
  turning on the clamp switch to generate a reverse current into the second terminal of the primary coil before the main switch is turned on;
  turning off the clamp switch before the main switch is turned on to discharge an equivalent capacitor on the common node through the reverse current after the clamp switch is turned on for a period;
  detecting a magnitude relationship between a node voltage of the common node and a first threshold voltage at a predetermined time point after the clamp switch is turned off and before the main switch is turned on; and
  determining a length of time for which the clamp switch is turned on before the main switch is turned on next time according to the magnitude relationship between the node voltage and the first threshold voltage detected at the predetermined time point to control the node voltage of the common node before the main switch is turned on next time to suppress a switching loss of the main switch.

16. The method according to claim 15, wherein the step of determining a length of time for which the clamp switch is turned on before the main switch is turned on next time according to the magnitude relationship between the node voltage and the first threshold voltage detected at the predetermined time point comprises:
  extending the length of time for which the clamp switch is turned on before the main switch is turned on next time when it is detected at the predetermined time point that the node voltage is greater than the first threshold voltage.

17. The method according to claim 16, wherein the step of determining a length of time for which the clamp switch is turned on before the main switch is turned on next time according to the magnitude relationship between the node voltage and the first threshold voltage detected at the predetermined time point further comprises:
  maintaining and fixing the length of time for which the clamp switch is turned on before the main switch is turned on subsequently each time when it is detected at the predetermined time point that the node voltage is less than the first threshold voltage.

18. The method according to claim 16, wherein the step of determining a length of time for which the clamp switch is turned on before the main switch is turned on next time according to the magnitude relationship between the node voltage and the first threshold voltage detected at the predetermined time point further comprises:
  shortening the length of time for which the clamp switch is turned on before the main switch is turned on next time when it is detected at the predetermined time point that the node voltage is less than the first threshold voltage.

19. The method according to claim 16, wherein the step of determining a length of time for which the clamp switch is turned on before the main switch is turned on next time according to the magnitude relationship between the node voltage and the first threshold voltage detected at the predetermined time point further comprises:
  maintaining, by a control signal generator, the length of time for which the clamp switch is turned on before the main switch is turned on when it is detected at the predetermined time point that the node voltage is less than the first threshold voltage and greater than a second threshold voltage; and
  wherein the second threshold voltage is less than the first threshold voltage.

20. The method according to claim 19, wherein the step of determining a length of time for which the clamp switch is turned on before the main switch is turned on next time according to the magnitude relationship between the node voltage and the first threshold voltage detected at the predetermined time point further comprises:
  shortening the length of time for which the clamp switch is turned on before the main switch is turned on next time when it is detected at the predetermined time point that the node voltage is less than the second threshold voltage.

* * * * *